Jan. 31, 1956 R. A. SANDBERG 2,732,615
METHOD OF SECURING A TUBE TO A SHEET METAL MEMBER
Filed Jan. 22, 1953 2 Sheets-Sheet 1
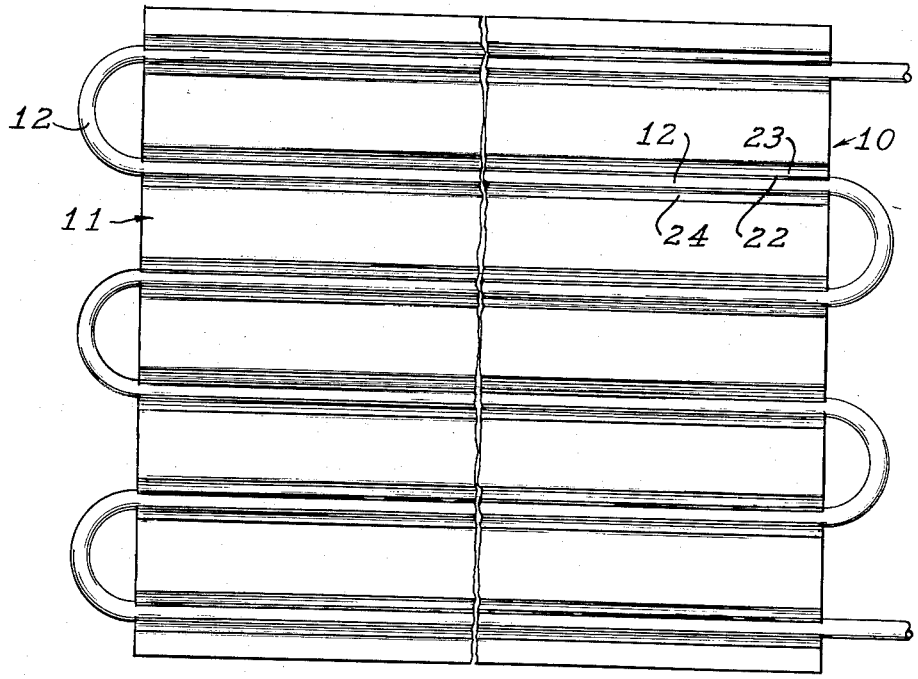
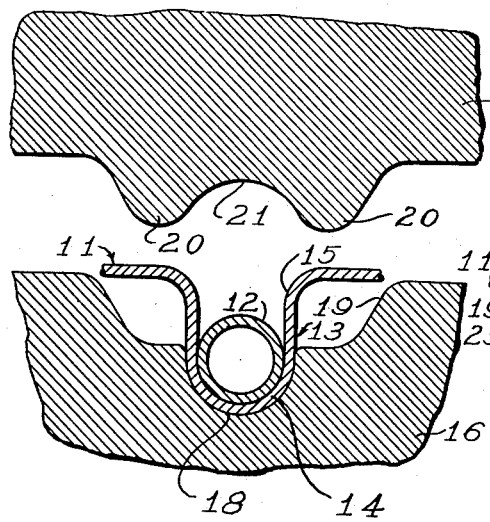
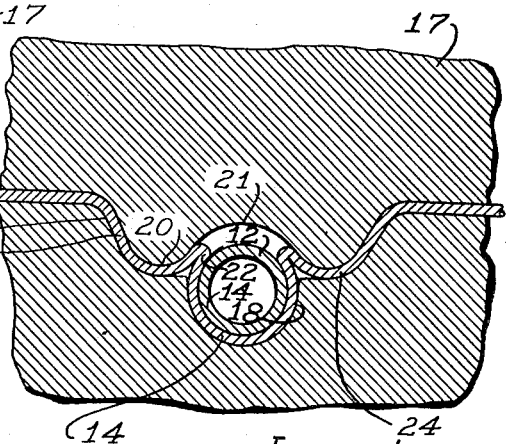
Inventor
RAY A. SANDBERG
By Attys Jan. 31, 1956   R. A. SANDBERG   2,732,615
METHOD OF SECURING A TUBE TO A SHEET METAL MEMBER
Filed Jan. 22, 1953   2 Sheets-Sheet 2
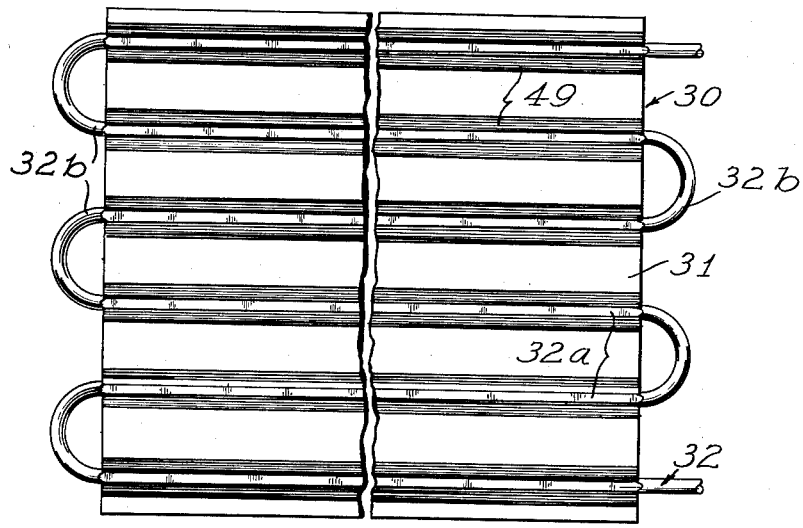
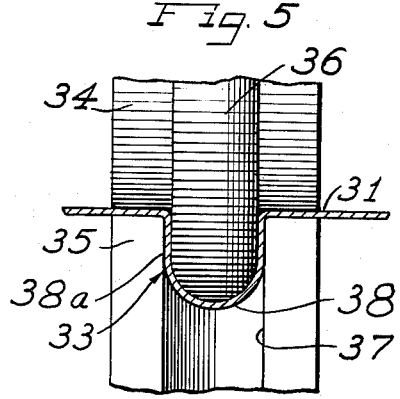
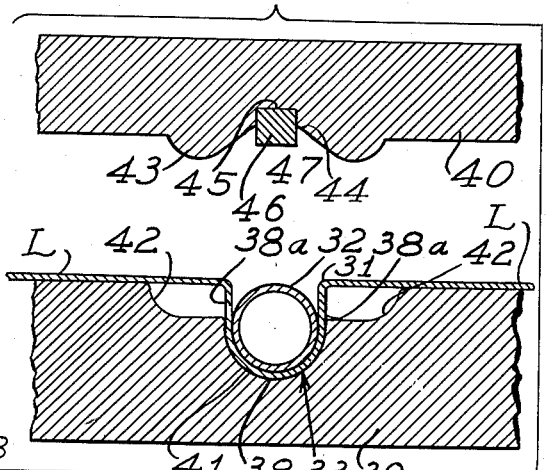
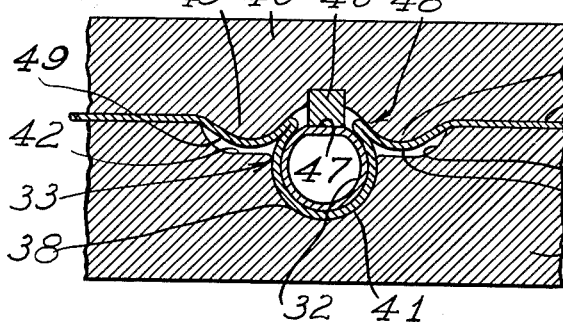
Inventor
RAY A. SANDBERG
By [signature] Attys

United States Patent Office 2,732,615
Patented Jan. 31, 1956

2,732,615

METHOD OF SECURING A TUBE TO A SHEET METAL MEMBER

Ray A. Sandberg, Waukegan, Ill., assignor to Houdaille-Hershey Corporation, Detroit, Mich., a corporation of Michigan Application January 22, 1953, Serial No. 332,693

11 Claims. (Cl. 29—157.3)

The present invention relates to a method of securing a tube to a sheet metal member, and more particularly to a method of making a heat exchanger of the plate and tube type.

In conventional plate and tube type heat exchangers, an elongated sinuous tube is generally secured to a backing plate of high thermal conductivity by brazing, soldering or welding. It has heretofore been proposed that the tube be secured in this manner within a shallow depression formed in the plate so that the heat transfer efficiency of the exchanger may be increased. Due to the necessary provision of means, such as welding or brazing, to secure the tube to the backing plate, such heat exchangers have been expensive and complicated in manufacture and the efficiency of heat transfer from the tubes to the plate have been low due to the necessarily small area of contact therebetween.

The present invention now provides an improved type of tube and plate heat exchanger similar to that disclosed in my copending application Serial No. 36,598, filed July 2, 1948, now Patent No. 2,585,043, dated February 12, 1952, and assigned to the assignee of the instant application in which the tube is firmly secured to the plate without the employment of external securing means, such as welding or brazing, and in which the area of contact between the tube and the plate is greatly increased to insure efficient heat exchange. In general, the heat exchanger of the present invention comprises a relatively thin backing plate of sheet metal of highly thermal conductivity and a tube secured to the backing sheet or plate by deformation of the plate into more than semi-peripheral contact with the tube.

The present application is a continuation-in-part of Serial No. 80,240, filed March 8, 1949, and Serial No. 124,179, filed October 28, 1949, both applications now being abandoned in favor of the present application.

The securing of the tube to the plate, as carried out by one embodiment of the method of the present invention, involves the forming of a groove or depression in the plate, the placing of a tube in the groove, the tube having a diameter less than the depth of the groove, and the formation of additional depressions or grooves in the plate by deforming portions of the plate immediately contiguous to the first formed depression. In this manner, the plate is deformed into greater than semi-peripheral surface contact with the tube to overlie a median diameter of the tube, thus anchoring the tube to the plate with the relatively great surface contact therebetween insuring efficient heat transfer from the tube to the associated backing plate.

This method is satisfactory for use in the formation of heat exchangers employing tubes having relatively small outside diameters, e. g., on the order of one quarter inch or less, and it may also be used with larger diameter tubes if desired. However, it has been found that in the use of the method with tubes of outside diameters on the order of from ⅜ to ½ inch or larger, the tube often does not have sufficient structural resistence to retain its original circular cross-sectional shape without permanent distortion of the tube where the metal plate is folded or swaged back on the tube into interlocking engagement therewith. This deformation of the tube may prevent close gripping peripheral contact between the tube and the plate along the entire length of the tube and thus may seriously interfere with the heat transfer efficiency of the heat exchanger.

Of course, the tube wall thickness may be increased to prevent such tube distortion, but this is not economically feasible due to the increased cost of such tubing. Further, tubing of relatively thin wall thicknesses, while of insufficient strength to resist distortion during forming of the exchanger, has sufficient bursting strength and other structural characteristics for the actual operational demands imposed upon it in use, and also thin-walled tubing is desirable for reasons of heat transfer efficiency.

A further embodiment of the present invention now makes possible the employment of tubing of relatively large diameters and relatively thin wall thicknesses in the formation of plate and tube type heat exchangers by a method generally similar to that above outlined. This further embodiment contemplates the positioning of the tube within a groove formed in a backing plate of desired thermal conductivity, the distortion or swaging of the groove side walls and the plate portions immediately adjacent thereto into engagement with the tube, and the distortion of the tube radially outwardly into closely gripping engagement with the swaged portions of the plate to insure a snug fit between the plate and the tube and the efficient transfer of heat between the tube and the plate.

The heat exchanger of this further embodiment thus comprises generally a backing plate of high thermal conductivity and a tube in interlocked engagement with the plate, both the tube and the plate being deformed from their configuration prior to assembly into tightly gripping, interlocked, thermally efficient engagement.

It is, therefore, and important object of the present invention to provide an improved method of making a heat exchanger of the tube and plate type of deforming the plate into greater than semi-peripheral surface contact with the tube to maintain the tube and plate in assembled efficient heat-transfer relation.

It is a further important object of the present invention to provide a method of making a plate and tube type heat exchanger in which the tube is secured within a groove formed in the plate by deformation of the plate, the plate having grooves formed therein adjacent the tube with contiguous plate portions extending into conforming contact with the tube above a median diameter thereof to securely lock the tube to the plate.

A still further important object of this present invention is to provide an improved method of forming a heat exchanger of the tube and plate type.

Still another object of the present invention is to provide a method of making a heat exchanger by disposing a tube in a groove formed in a backing plate and depressing immediately contiguous plate portions to force the plate into greater than semi-peripheral contact with the tube.

It is, therefore, an additional important object of the present invention to provide an improved method for the manufacture of plate and tube type heat exchangers, in which the tubes of the exchanger are of relatively large diameter and of relatively thin wall thickness.

Still another important additional object of the present invention is to provide an improved method of making a tube and plate type heat exchanger including the steps of positioning a tube in a groove formed in a backing plate, swaging adjacent portions of the plate into engagement with the tube to overlie a median diameter thereof, and deforming the tube radially outwardly into snug fitting, interlocking engagement with swaged portions of the plate.

Other and further important objects of this invention will be apparent from the disclosures in the specification and the accompanying drawings.

On the drawings:

Figure 1 is a broken, plan view of a heat exchanger of a first embodiment of the present invention;

Figure 2 is an enlarged fragmentary, sectional view illustrating a step in the method of making the heat exchanger of Figure 1;

Figure 3 is an enlarged, fragmentary, sectional view similar to Figure 2 and illustrating a further step in the making of the heat exchanger of Figure 1;

Figure 4 is a broken, plan view of the heat exchanger of a second embodiment of the present invention;

Figure 5 is an enlarged, fragmentary, sectional view illustrating a step in the method of making the heat exchanger of Figure 4;

Figure 6 is an enlarged, fragmentary, sectional view illustrating a further step in the making of the heat exchanger of Figure 4;

Figure 7 is an enlarged, fragmentary, sectional view similar to Figure 6 and illustrating a further step in the making of the heat exchanger of Figure 4.

As shown on the drawings:

In Figure 1, reference numeral 10 refers generally to a heat exchanger of the plate and tube type including a backing plate 11 and a continuous length of tubing 12 of sinuous shape secured to the backing plate 11. It is to be noted that those portions of the serpentine or sinuous length of tubing 12 extending across the width of backing plate 11 are substantially straight with the connecting curved portions of the tubing 12 extending beyond the backing plate 11. In this manner, it is not necessary to deform the backing plate 11 into a serpentine or sinuous path to receive the tube 12 but rather, it is only necessary to secure the straight portions of the tubing 12 to the backing plate 11.

The method of securing the serpentine or sinuous length of tubing 12 to the plate 11 as herein described insures the efficient transfer of heat from the tubing 12 to the relatively large heat transfer surface of plate 11.

The plate 11 is initially deformed to provide a plurality of parallel, spaced depressions or grooves 13 to receive each of the substantially straight portions of the tubing 12. Each of the depressions or grooves 13, as best shown in Figure 2, is provided with a closed arcuate bottom 14 and upstanding side walls 15 extending upwardly from the closed bottom 14. The depth of groove 13 is greater than the external diameter of the tubing 12 for reasons which will be hereinafter more fully described.

As the next step of the method, the tubing 12 is positioned within the groove or depression 13. In the manufacture of a heat exchanger such as that illustrated in Figure 1, only the straight portions of the serpentine tubing is placed within the groove 13 with the curved portions of the tubing extending beyond the plate 11. It is to be noted that when the tube 12 is bottomed within the depression or groove 13, peripheral contact between tube and groove is established, the outer periphery of the tube having approximately the same radius of curvature as the inner periphery of the arcuate groove bottom 14, so that the tube 12 fits snugly within the groove 13.

The securing of the tube within the plate depression 13 is carried out by a pair of cooperating dies or rollers 16 and 17. The backing die or roller 16 is recessed as at 18 to provide support for the bottom 14 of the groove 13 and for adjacent portions of the plate 11. If a die is used, it is preferably of such size as to receive the entire exchanger unit 10 shown in Figure 1. The backing die 16 is also recessed, as at 19, immediately adjacent each side of the recess 18. The recess 19 is preferably contiguous with the entire length of the recess 18 and with the width of the backing plate 11.

A movable forming die or roller assembly 17, adapted for cooperation with the backing die 16, is provided with a pair of downwardly convex protuberances 20 separated by an upwardly concave depression or groove 21. As shown in Figure 3, one of the protuberances 20 is adapted to extend into each of the grooves 19 of backing die 16 and the arcuate recess 21 is adapted to receive the tubing 12.

As shown in Figure 3, the protuberances 20 bridge the uppermost parts of the upstanding side wall portions 15 to lie outwardly thereof and thus serve to force the metal of the backing plate 11 into the grooves 19 to assume the contour of these grooves provided in the backing die 16. It will be seen that that portion of the upstanding wall 15 of groove 13 and the immediately adjacent plate surfaces are of greater length than the side walls of die 16 defining recess 19. The metal of backing plate 11 is confined between the dies 16 and 17 upon movement of the dies into mating engagement. The excess metal of the plate 11 is forced inwardly into the recess 21 of movable die 17 so that this excess metal is deformed inwardly to overlie immediately contiguous portions of tube 12, as at 22. The pair of grooves 23 and 24 are formed simultaneously with the deformation of the plate into contact with the tube. As will be apparent from Figure 3 of the drawings, an acute angle fold of metal is formed, at 22, at the junction between the closely spaced oppositely concave portions of the main groove 13 and of each adjacent auxiliary groove 23 or 24, and the opposed pairs of such metal folds overlying each tube length 12 exert a constrictive force on such tube length locking the same in said main groove and holding the wall of said main groove in greater than semi-peripheral conforming surface contact with said tube length. All the metal of plate 11 in that section which encases the tube 12 and a goodly portion of the double-folded sections is under compressive stress at all times from the deformation of the excess metal in the preceding operation. The forces employed in the operation to reshape the excess metal around the tube 12 are of such magnitude as to cause the plate material 11 to conform to any commercial variations of the tube diameter or lack of roundness, thereby insuring a consistent metal-to-metal contact between tube 12 and plate 11 at all times. Further, there is no difficulty in simultaneously forming the pair of parallel grooves, as would be the case if it were necessary to stretch the metal of the plate to form the grooves. Therefore, the grooves 23 and 24 may be simultaneously formed by a simple rolling or stamping process.

It may thus be seen that the backing plate 11 is deformed into greater than semi-peripheral contact with the tube 12. Both portions of the side walls 15 of recess 13 are thus deformed inwardly into contact with the outer periphery of the tube to overlie a median diameter of the tube to effectively prevent its removal from its position within the recess 13. It will be understood that the supplemental grooves 23 and 24 may either be co-extensive with the main groove 13, or that supplemental grooves may be formed only at spaced points along the length of the main groove.

The heat exchanger, as shown in Figure 1, thus includes the backing plate 11 and the continuous, sinuous tube 12, the straight portions of which are secured within recessed or grooves formed in the backing plate 11 by deformation of the backing plate into greater than semi-peripheral contact with the tubing. The immediately contiguous main groove 13 and the supplemental grooves 23 and 24 lie on the same side of the plate 11, with the metal of the main groove in contact with the tube to securely lock the tube in the groove. It has been found that this relatively great surface contacting area through the backing surface of the tube increases the efficiency of heat transfer over those welded tube and plate type heat exchangers of the prior art.

In Figure 4, reference numeral 30 refers generally to the heat exchanger of the plate and tube type including a backing plate 31 and a continuous length of tubing 32 of sinuous shape secured to the backing plate 31.

It is to be noted that those portions 32a of the serpentine or sinuous length of tubing 32 extending across the length of the backing plate 31 are substantially straight with the connecting curved portions 32b of the tubing 32 extending beyond the backing plate 31. In this manner, it is not necessary to deform the backing plate 31 into a serpentine or sinuous path to receive the tube 32, but rather it is only necessary to secure the straight portions of the tube to the backing plate.

The method of securing the serpentine length of tubing to the plate 31, as herein described, insures the efficient transfer of heat from the tube 32 to the relatively large heat transfer surface of the plate 31. The plate 31 may be any desired sheet metal having a high heat transfer efficiency and suitably may be a mild, low carbon steel having a thickness on the order of No. 20 U. S. S. gauge (0.0359 inch), and the tube is preferably formed of copper of an outside diameter on the order of ⅜ to ½ inch and a wall thickness of about 0.0359 inch. Other metals than copper, such as iron or steel, or aluminum, may be used for the tube, and larger diameters than indicated may be employed in the method of my invention. The tube is suitably seamless but may be a welded tube.

The plate 31 is sufficiently deformed to provide a plurality of parallel, spaced depressions or main grooves 33 each extending across the length of the plate for receiving each of the substantially straight portions of the tube 32. The grooves 33 may desirably be formed as illustrated in Figure 5 by the cooperation of a pair of rolls 34 and 35. The roll 34 is provided with a central, radially outwardly extending annular embossment 36, while the roll 35 is provided with a peripheral annular groove 37 for receiving the embossment 36 and that portion of the plate 31 confined between the rolls. It will be seen that when the plate 31 is passed between the rolls 34 and 35 that the groove 33 is formed therein to extend thereacross. Dies may be used in place of the rolls 34 and 35.

Each of the grooves 33 is provided with an arcuate bottom portion 38 and parallel upstanding straight side walls 38a. The depth of the groove 38 is greater than the exterior diameter of the tubing 32 and determines the amount of wrap of the metal of the plate about the tube. As will hereinafter become more apparent, the greater the depth of the groove, the greater the amount of wrap about the periphery of the tube. It will be noted from Figure 6 that when the tube 32 is positioned within the groove 33, the tube and the arcuate groove bottom 38 are in close fitting peripheral contact, since the arcuate groove bottom 38 has approximately the same radius of curvature as the outer periphery of the tube. It will be understood that in the manufacture of a heat exchanger such as that shown in Figure 4, only the straight portions 32a of the tube 32 are bottomed within the grooves 33 and that the curved portions 32b of the tube 32 extend outwardly beyond the lateral edges of the plate 31.

In the next step in the method of making the heat exchanger, the straight lengths of the tube are interlocked within the grooves 33 by means of a pair of cooperating dies, or rollers, 39 and 40. The backing die 39 is recessed as at 41 to provide a conforming support for the bottom 38 of the groove 33 and for the adjacent flat portions of the plate 31. If a die is used, it is preferably of such size as to receive the entire exchanger unit 30 shown in Figure 4. The backing die 39 is also recessed, as at 42, immediately adjacent both lateral edges of the groove 38, the recesses 42 being preferably contiguous with the entire length of the recess 41, i. e., with the full length of the backing plate 31.

The second forming die or roller 40 is adapted for movement relative to the backing die into and out of cooperating relationship with the backing die 39. The movable die 40 is provided with a pair of spaced parallel, arcuate protuberances 43 separated by an arcuate depression or groove 44. The groove 44 is provided with an elongated, generally rectangular recess 45 in which is secured an elongated insert punch bar 46 of rectangular cross-section having a depending flat face 47. The punch bar 46 projects into the space provided by the groove 44 to provide clearance spaces on either side of the bar.

As shown in Figure 6, the protuberances 43 serve to deform the metal of the backing plate 31 into the cooperating prooves 42. However, even after full closing of the dies 39 and 40, as shown in Figure 7, no contact is made between the portions of the plate contiguous to the groove 38 and the bottoms of the grooves 42. This is because the protuberances 43 are shallower than the grooves 42.

The metal immediately acted upon by the protuberances 43, as the upper die 40 is moved toward the lower die 39, is that of the unsupported portions of the plate laterally contiguous to the also unsupported upstanding wall portions 38a of the groove 33. These unsupported laterally contiguous portions are first deflected downwardly from the main plane of the plate, that is, from the plane of the lands L between the grooves 33. Thereafter, as the dies 40 and 39 continue to move relatively toward each other, the metal of the unsupported portions is moved inwardly about the tube as a mandrel to form nearly closed folds 48 extending into the clearances on either side of the punch bar 46. The inwardly deformed folds 48 are caused to lap the adjacent tube wall and to wrap more or less of the upper periphery of the tube depending upon the original depth of the groove 33. The result is that the metal of the plate wraps more than a half of the periphery of the tube and thus locks the tube in its groove 38.

By the coaction of the forming dies, the plate 31 is provided with a pair of parallel shallow supplementary grooves 49 laterally contiguous to and coextensive with each main groove 33.

Also, in the later stages of the closing movement of the cooperating dies 39 and 40, the lower face 47 of the insert 46 contacts the exposed surface of the tube 32 between the folds 48 to deform such surface inwardly and at the same time expands the rest of the tube radially outwardly into tight gripping, interlocked engagement with the inner surfaces of the groove 33 and of the deformed portions 48 of the plate 31. The forming dies 39 and 40 are moved together under relatively heavy forces of such magnitude as to deform both the plate and the tube into interlocking engagement to insure at all times an extended metal-to-metal surface contact between the tube 32 and the plate 31.

As previously indicated, the extent to which the metal of the plate is wrapped about the tube can be varied by varying the depth of the groove 33. Regardless, however, of the extent of the wrap of plate metal about the tube, it is preferable, for a given depth of the groove 33, to so arrange and dimension the profiles of the cooperating dies 39 and 40 as to effect a cold working of the metal that is deformed by the dies. Such cold working is effected not only by the deformation of the metal but by an actual stretching of the metal due to the fact that there is not initially at the stage of the operation illustrated in Figure 6 a sufficient length of unsupported metal to form the supplemental grooves 49 and the folds 48 and to lap said folds about the tube. In addition, there is a slight stretching of the metal in the lands L between the sets of grooves. This occurs during the final closing movement of the dies 39 and 40 and before the full pressure of the flat faces of the dies upon the lands has been exerted. The lands are not tightly clamped between the flat die faces until the major deformation of the unsupported metal has occurred, so that the metal in the lands L is also put under tension. The tremendous pressure, of the order of 1500 tons on an assembly having a surface area of from 750 to 1500 sq. in., causes the metal to take a set in its stressed condition. Thus, upon the release of pressure and the removal of the panel assembly from the die, the panel as a whole remains in a relatively flat condition.

Thus, as a result of the cold working of the metal during the swaging or deforming operations, and the pressure subsequently applied to the metal of the lands, the metal takes a permanent set under a tension tending to contract the loop of metal lapped about the tube. This contracting tendency maintains good mechanical and thermal contact between the plate and the tube.

The tube thus serves as a mandrel about which the plate is swaged or deformed, and the deformation of the tube with the resulting radial expansion of confined portions thereof produces positive and permanent peripheral contact between the tube and the inner wall of the main groove 33 and of the deformed plate loops 48. This expansion of the tube accommodates any slight irregularities or distortions of either the plate or the tube so that virtually perfect, continuous metallic contact is obtained therebetween.

As a result of the deformation of both the tube and the plate, the members are in extended surface engagement over a tube area greater than its semi-periphery. If desired, the deformation of either the plate or the tube, or both the plate and the tube, into interlocking engagement may be either coextensive with the length of the plate 31 or for spaced distances along the length of the plate. The deformation of the tube obviates the difficulties heretofore caused by the attempted deformation of a plate into extended plate engagement with a tube of relatively large external diameter.

The heat exchanger, as shown in Figure 4, thus includes the backing plate 31 and the continuous, sinuous tube 32, the straight portions of which are secured within the surface in grooves formed in the backing plate 31 by deformation of the backing plate into greater than semi-peripheral contact with the tubing and the deformation of the tubing radially outwardly into interlocking contact with the plate. The convex portions of the main grooves 33 and of the supplemental grooves 43 and 44 lie on the same side of the plate 31. Therefore, since the deformed portions 48 of the plate terminate approximately in the mean plane of the plate 31, a finished heat exchanger construction is provided having one substantially plane surface, as is desirable in many installations.

It will be understood that modifications and variations may be effected without departing from the scope of the novel concepts of the present invention.

I claim as my invention:

1. In a method of securing a straight length of metal tubing in a flat metal backing plate having a main groove for receiving said tubing that is formed with a semi-cylindrical bottom wall of substantially the same inside diameter as the outside diameter of said tubing and with plane upstanding parallel side wall portions rising above said tubing when said tubing is bottomed in said groove, the improvement which comprises rigidly and conformingly backing said semi-cylindrical bottom wall and also plane portions of said plate spaced outwardly of said side walls to leave upstanding portions of said side walls and contiguous plane portions of said plate unbacked, and exerting a reshaping pressure against only said unbacked portions to depress the metal of said contiguous plane portions into auxiliary grooves lying wholly on the same side of the general plane of said plate as said main groove and on either side of said main groove and simultaneously to form and move a fold of metal along the sides of said auxiliary grooves inwardly toward said main groove and to reshape said upstanding wall portions inwardly into conforming contact with said tubing, whereby metal of said plate is wrapped about more than one-half the periphery of said tubing without movement of said backed plane portions of the plate spaced outwardly of said side walls.

2. In a method of making a heat exchanger including securing straight lengths of a continuous sinuous tubing in a flat metal plate having parallel main grooves for receiving said straight lengths, wherein each of said grooves has a semi-cylindrical bottom wall of substantially the same inside diameter as the outside diameter of said tubing and has plane upstanding side wall portions rising above said tubing when said straight lengths are bottomed in said grooves, the improvement which comprises rigidly and conformingly backing said semi-cylindrical bottom walls and also plane portions of said plate more remote from said grooves while leaving said upstanding side wall portions and contiguous plane portions of said plate unbacked, and exerting a reshaping pressure against only said unbacked portions to deform the metal of said contiguous plane portions into auxiliary grooves lying wholly on the same side of the general plane of said plate as said main grooves, with one auxiliary groove on each side of each main groove, and simultaneously to form and bend a fold of metal along the side of each auxiliary groove inwardly toward the corresponding main groove and to reshape said upstanding wall portions into conforming contact with the straight lengths of tubing lying therebetween, whereby metal of said plate is wrapped about more than one-half the periphery of said tubing without movement of the metal in said more remote backed plane portions of said plate.

3. In a method of securing a straight length of metal tubing of continuous annular cross-section in a flat metal backing plate having a main groove for receiving said tubing that is formed with a semi-cylindrical bottom wall of substantially the same inside diameter as the outside diameter of said tubing and with plane upstanding parallel side wall portions, the improvement which comprises rigidly and conformingly backing said semi-cylindrical bottom wall and also plane portions of said plate spaced outwardly of said side walls to leave upstanding portions of said side walls and contiguous plane portions of said plate unbacked, exerting a reshaping pressure against said unbacked portions to press the metal of said contiguous plane portions into auxiliary grooves lying wholly on the same side of the general plane of said plate as said main groove and on either side of said main groove and simultaneously to form and move a fold of metal along the sides of said auxiliary grooves inwardly toward said main groove and to reshape said upstanding wall portions inwardly into conforming contact with said tube, whereby metal of said plate is wrapped about more than one-half the periphery of said tubing without movement of said backed plane portions of the plate spaced outwardly of said side walls, and deforming exposed portions of said tubing radially inwardly while supporting an opposed portion of the tubing to cause portions thereof engaged by said plate to expand radially outwardly into extended surface engagement with the metal of the main groove and the metal of the so-wrapped plate portions.

4. In a method of securing a straight length of metal tubing in a flat metal backing plate having a groove for receiving said tubing that is formed with a semi-cylindrical bottom wall of substantially the same inside diameter as the outside diameter of said tubing and with generally plane upstanding parallel side walls rising above said tubing when said tubing is bottomed in said groove, the improvement which comprises rigidly and conformingly backing said semi-cylindrical bottom wall and also plane portions of said plate spaced outwardly of said side walls to leave therebetween unbacked upstanding portions of said side walls and contiguous portions of said plate joining said side walls and exerting a reshaping pressure against only said unbacked portions to move said unbacked upstanding portions and contiguous plate portions on each side of said groove toward each other to form a fold of metal along each side of said groove and moving said folds of metal toward each other and reshaping said folds of metal as the same are moved into conforming contact with said tubing, whereby metal of said plate is wrapped about more than one-half the periphery of said tubing without movement of said backed plane portions of said plate spaced outwardly of said side walls.

5. In a method of securing a straight length of metal tubing in a generally flat metal backing plate having a groove for receiving said tubing that is formed with a semi-cylindrical bottom wall of substantially the same inside diameter as the outside diameter of said tubing and with generally plane upstanding side walls extending to a height above said tubing when said tubing is bottomed in said groove, said side walls and contiguous portions of said plate forming a bend of metal therebetween on either side of said groove, the improvement which comprises rigidly and conformingly backing said semi-cylindrical bottom wall and also plane portions of said side walls spaced outwardly of said bend on either side of said groove to leave unbacked said side walls, metal bends and contiguous portions, and exerting a reshaping pressure against said unbacked portions including a pressure against said metal bends biasing the same toward each other and tending to press together the metal of each of said bends to form acute angle folds and moving said acute angle folds toward each other and reshaping said folds as the same are moved into conforming contact with said tubing to overlie more than one-half the periphery of said tubing, said reshaping and moving of said unbacked portions being accomplished without movement of said backed plane portions of said plate lying outwardly of said unbacked portions.

6. In a method of securing a straight length of metal tubing to an elongated heat conductive member having a transverse groove for receiving said tubing with a semi-cylindrical portion of the member defining the bottom of the groove and being of substantially the same inside diameter as the outside diameter of said tubing and with generally straight upstanding parallel portions of said member defining the sides of said groove and rising above said tubing when said tubing is bottomed in said groove, the improvement which comprises rigidly and conformingly backing said semi-cylindrical portion of said member and also backing straight portions of said member spaced outwardly of said upstanding portions of said member to leave therebetween effectively unbacked at least the upper part of said upstanding portions of said member and contiguous portions of said member joining said upstanding portions and said backed straight portions of said member, and exerting a reshaping pressure against only said unbacked portions to depress the contiguous portions into auxiliary grooves lying wholly on the same side of said member as said first-mentioned groove and on either side of said first-mentioned groove and simultaneously to form and move a fold along the sides of said auxiliary grooves inwardly towards said first-mentioned groove and to reshape said upstanding portions inwardly into conforming contact with said tubing, whereby said member is wrapped about more than one-half the periphery of said tubing without movement of said backed straight portions of said member which are spaced outwardly of said upstanding portions of said member.

7. In a method of securing a straight length of metal tubing to an elongated heat conductive member having a transverse groove for receiving said tubing with a semi-cylindrical portion of the member defining the bottom of the groove and being of substantially the same inside diameter as the outside diameter of said tubing and with generally straight upstanding parallel portions of said member defining the sides of said groove and rising above said tubing when said tubing is bottomed in said groove, the improvement which comprises rigidly and conformingly backing said semi-cylindrical portion of said member and also backing straight portions of said member spaced outwardly of said upstanding portions of said member to leave therebetween effectively unbacked at least the upper part of said upstanding portions of said member and contiguous portions of said member joining said upstanding portions and said backed straight portions of said member, exerting a reshaping pressure against only said unbacked portions to depress the contiguous portions into auxiliary grooves lying wholly on the same side of said member as said first-mentioned groove and on either side of said first-mentioned groove and simultaneously to form and move a fold along the sides of said auxiliary grooves inwardly towards said first-mentioned groove and to reshape said upstanding portions inwardly into conforming contact with said tubing, whereby said member is wrapped about the more than one-half the periphery of said tubing without movement of said backed straight portions of said member which are spaced outwardly of said upstanding portions of said member, and deforming exposed portions of said tubing radially inwardly while supporting an opposed portion of the tubing to cause portions thereof engaged by said member to expand radially outwardly into extended surface engagement with the so-wrapped portions of said member.

8. In a method of securing a straight length of metal tubing in an elongated sheet metal member lying generally in a single plane and having a downwardly offset integral portion thereof defining a main groove for receiving said tubing, the bottom portion of said groove conforming to the exterior contour of said tubing and upstanding side wall portions of said groove rising above said tubing when the same is bottomed therein, the improvement which comprises rigidly and conformingly backing said groove bottom portion while leaving said side wall portions and immediately contiguous plane portions of said member unbacked, applying to said immediately contiguous portions outwardly of the highest points of said upstanding wall portions forces directed downwardly and inwardly toward said upstanding wall portions to exert a reshaping pressure against only said unbacked portions to depress the metal of said contiguous plane portions into auxiliary grooves lying wholly on the same side of the general plane of said member as said main groove and on either side thereof and simultaneously to form and move a fold of metal along the sides of said auxiliary grooves inwardly toward said main groove and to reshape said upstanding wall portions into conforming contact with said tubing, and contemporaneously with said reshaping step moving rigid surfaces into mating and confining engagement with plane portions of said member forming extensions of said contiguous plane portions.

9. In a method of securing a length of heat conductive tubing to an elongated heat conductive sheet member having a transverse groove for receiving said tubing with a lower portion of the member defining the bottom of the groove and conforming to the exterior contour of said tubing and with upstanding portions of said member defining the sides of said groove and rising above said tubing, the improvement which comprises backing said lower portion of said member and leaving unbacked at least the uppermost parts of said upstanding portions and portions immediately contiguous thereto, exerting a reshaping force against said unbacked portions by moving a rigid body having an upwardly concave surface bridging said uppermost parts into engagement with said immediately contiguous portions outwardly of said uppermost parts, continuing the downward movement of said body to progressively force said contiguous portions downwardly and said upstanding portions inwardly to form acute bend folds in said elongated member at the respective sides of said groove, and to press the lower fold walls into extended conforming contact with said tubing and the upper fold walls into an arcuate shape sloping downwardly and laterally outwardly from the respective bends, whereby said member is wrapped about more than one-half the periphery of said tubing.

10. In a method of securing a straight length of metal tubing in an elongated sheet metal member having a downwardly offset integral portion thereof defining a main groove for receiving said tubing, the bottom portion of said groove conforming ot the exterior contour of said tubing and upstanding side wall portions of said groove rising above said tubing when the same is bottomed therein, the improvement which comprises rigidly and conformingly backing said groove bottom portion while leaving said side wall portions and immediately contiguous portions of said member unbacked, applying to said immediately contiguous portions outwardly of said upstanding wall portions forces directed downwardly and inwardly toward said upstanding wall portions to exert a reshaping pressure against only said unbacked portions to depress the metal of said contiguous portions into auxiliary grooves lying wholly on the same side of the general plane of said member as said main groove and on either side thereof and simultaneously to form and move a fold of metal along the sides of said auxiliary grooves inwardly toward said main groove and to reshape said upstanding wall portions into conforming contact with said tubing, whereby said sheet metal member is wrapped about more than one-half the periphery of said tubing.

11. In a method of securing a length of heat conductive tubing to an elongated heat conductive sheet member having a transverse groove for receiving said tubing with a lower portion of the member defining the bottom of the groove conforming to the exterior contour of said tubing and with upstanding portions of said member defining the sides of said groove and rising above said tubing when the same is bottomed in said groove, the improvement which comprises backing said lower portion of said member and leaving unbacked at least the uppermost parts of said upstanding portions and portions immediately contiguous thereto, exerting a reshaping force against said unbacked portions through the medium of downwardly and outwardly sloping die portions spaced to bridge said uppermost parts, moving said die portions into initial engagement with said immediately contiguous portions outwardly of said uppermost parts, continuing the downward movement of said die portions to progressively force said contiguous portions downwardly and said upstanding portions inwardly to form acute bend folds in said elongated member at the respective sides of said groove and to press the lower walls of said folds into extended surface conforming contact with said tubing and to cause the upper walls of said folds to assume contours sloping downwardly and laterally outwardly from the respective bends of said folds, whereby said member is wrapped about more than one-half the periphery of said tubing.

References Cited in the file of this patent
UNITED STATES PATENTS

| | | |
|---|---|---|
| 1,971,723 | O'Dell | Aug. 28, 1934 |
| 1,982,075 | Smith | Nov. 27, 1934 |
| 2,091,584 | Brown | Aug. 31, 1937 |
| 2,092,170 | Kritzer | Sept. 7, 1937 |
| 2,245,069 | Clarke | June 10, 1941 |
| 2,281,299 | Steenstrip | Apr. 28, 1942 |
| 2,382,340 | Smith | Aug. 14, 1945 |
| 2,585,043 | Sandberg | Feb. 12, 1952 |
| 2,646,259 | Powell | July 21, 1953 |
| 2,646,971 | Raskin | July 28, 1953 |
| 2,661,191 | Sandberg | Dec. 1, 1953 |
| 2,688,794 | Mulutich | Sept. 14, 1954 |